United States Patent [19]

Adams et al.

[11] Patent Number: 4,696,540
[45] Date of Patent: Sep. 29, 1987

[54] OPTICAL FIBRE CONNECTOR HAVING PARTICULAR UTILITY FOR UNDERWATER USE

[75] Inventors: Graham L. Adams, London; Richard C. E. Durrant, Bishops Stortford, both of England

[73] Assignee: STC, plc, Strand, England

[21] Appl. No.: 799,313

[22] Filed: Nov. 18, 1985

[30] Foreign Application Priority Data

Dec. 12, 1984 [GB] United Kingdom ................ 8431281

[51] Int. Cl.$^4$ ................................................ G02B 6/38
[52] U.S. Cl. ................................ 350/96.21; 350/96.20
[58] Field of Search ................ 350/96.20, 96.21, 96.22

[56] References Cited

U.S. PATENT DOCUMENTS 4,411,491 10/1983 Larkin et al. ................ 350/96.21
4,598,290 7/1986 Collins et al. ................ 350/96.20 X

FOREIGN PATENT DOCUMENTS 8300935 3/1983 World Int. Prop. O. .
2034496 6/1980 United Kingdom .

Primary Examiner—Eugene R. LaRoche
Assistant Examiner—James C. Lee
Attorney, Agent, or Firm—Kerkam, Stowell Kondracki, & Clarke

[57] ABSTRACT

An optical fibre connector which can be connected or disconnected underwater without contamination of optical fibre termination lenses. When the connector is disconnected, the terminations of each connector element are disposed in respective chambers which are sealed by respective diaphragms. Upon connection the two diaphragms are brought into sealing contact and the terminations of one connector element caused to enter the chamber of the other connector element following penetration of both diaphragms.

19 Claims, 6 Drawing Figures

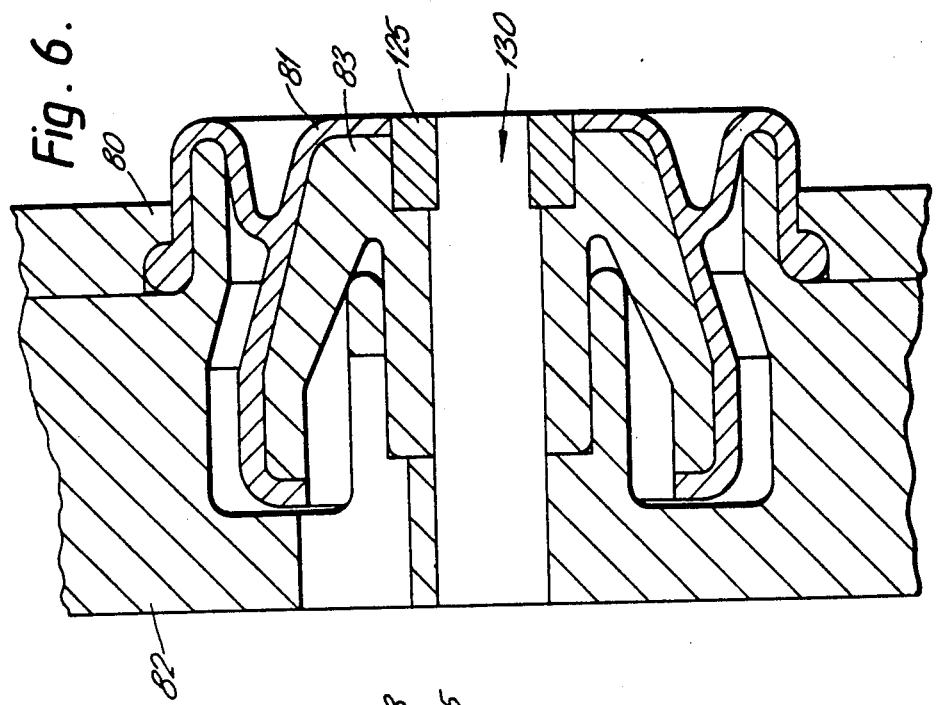
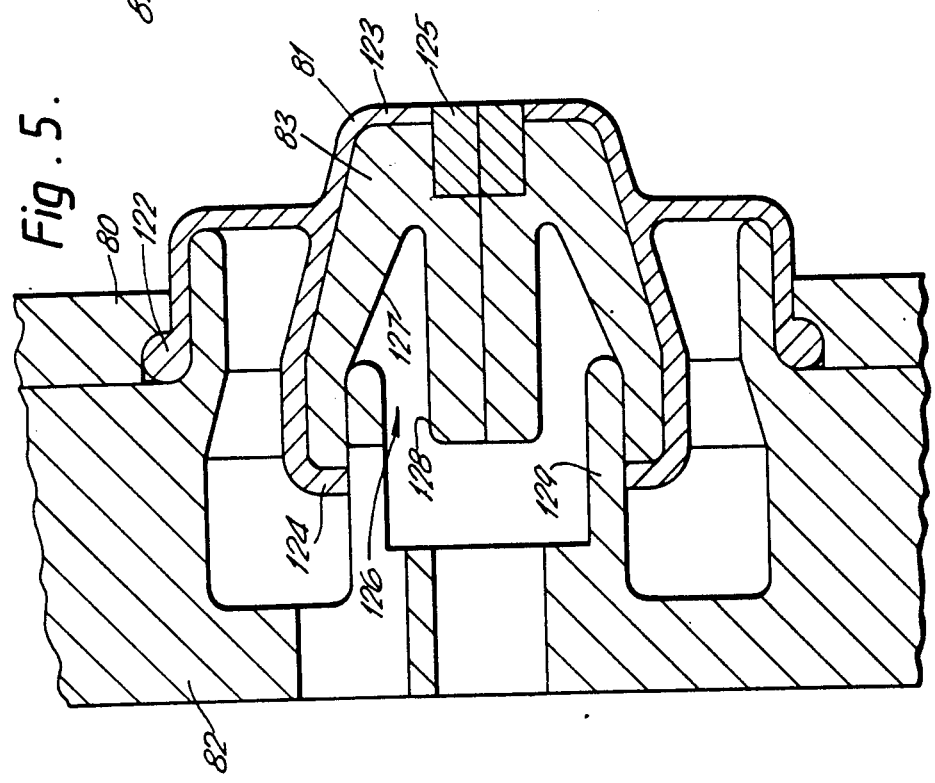

OPTICAL FIBRE CONNECTOR HAVING PARTICULAR UTILITY FOR UNDERWATER USE

BACKGROUND OF THE INVENTION

This invention relates to optical fibre connectors and in particular, but not exclusively, to optical fibre connectors for underwater use.

Whereas the offshore oil industry presently employs oil rig platforms from which the operation of underwater elements, valves, etc., is controlled, it is proposed that in future many such operations will be controlled remotely from the land. In view of the intrinsic requirements in force in the oil industry, the use of optical fibre systems is particularly applicable for such remote operation. In the case of valve actuation, this is usually done electrically using a very small amount of electrical power to actuate a pilot valve which then diverts hydraulic power to operate a larger valve. GB Pat. Ser. No. 2150780 describes various optical actuators which may be used to actuate such pilot valves, or other devices, rather than doing this electrically.

It is a requirement of such remote control systems that the connection of the optical fibre cables to the devices located under the water can be made underwater and that the cable can be subsequently disconnected under the water.

In GB Application Ser. No. 2166261A there is disclosed a radial connector, that is a connector in which the fibres extend in a radial direction, relative to the axis of a cable to be connected, for the actual optical connection. The present invention is, however, concerned with an axial type of connector.

SUMMARY OF THE INVENTION

According to one aspect of the present invention there is provided an optical fibre connector including two connector elements, wherein when the connector elements are disconnected optical fibre terminations to be optically coupled by the connector are disposed in respective chambers of the connector elements, which chambers are sealed by respective diaphragm means, and wherein when the connector elements are connected the two diaphragm means are in sealing contact with one another and the terminations of one connector element are disposed in the chamber of the other element having penetrated both diaphragm means.

According to another aspect of the present invention there is provided a method of optically connecting two fibre optic terminations comprising disposing each termination in a respective connector element chamber sealed by respective diaphragm means, bringing the two diaphragm means into sealing contact and causing the termination disposed in one chamber to penetrate both of the diaphragm means and to enter the other sealed chamber in alignment with the termination in the other sealed chamber.

BRIEF DESCRIPTION OF THE DRAWINGS

Embodiments of the invention will now be described with reference to the accompanying drawings, in which:

FIG. 5 shows on an enlarged scale a section through one of the collet and diaphragm arrangements of the embodiment of FIGS. 3 and 4 in the closed (connector elements disconnected) position, and FIG. 6 shows the collet and diaphragm arrangement of FIG. 5 in the open (connector elements connected) position.

DESCRIPTION OF THE PREFERRED EMBODIMENTS

A particular requirement of underwater optical fibre connectors is that lenses disposed at the ends of the optical fibres, and via which the optical connections actually take place, should be protected in some manner when the connector elements are not connected to prevent damage thereto, and to keep them clean. When the connector elements are, however, connected underwater, the protection must be removed or at least displaced. Similarly, when the connector elements are disconnected underwater the protection must be replaced. Thus it is desirable that the protection is automatically moved upon the acts of connection and disconnection. Additionally, the connector elements are required to be connectable and disconnectable in a simple manner to facilitate reliably performing these operations underwater.

Figure 1:
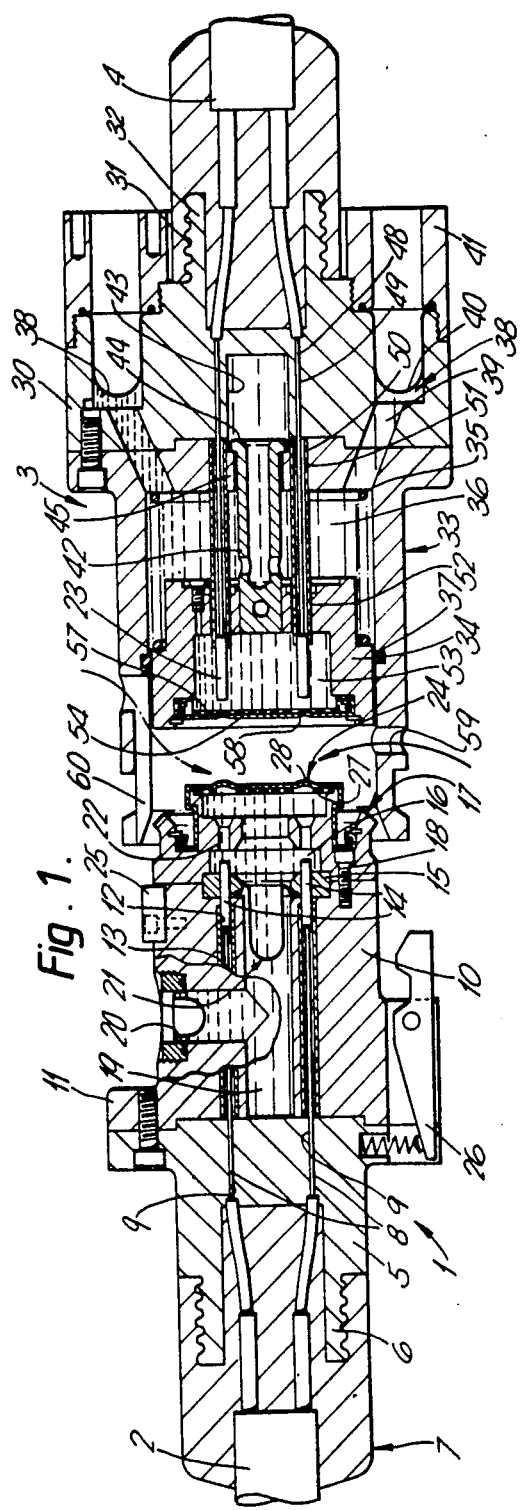
FIG. 1 shows, generally in cross-section, a first embodiment of optical fibre connector prior to interconnection of the two connector elements thereof.
Figure 2:
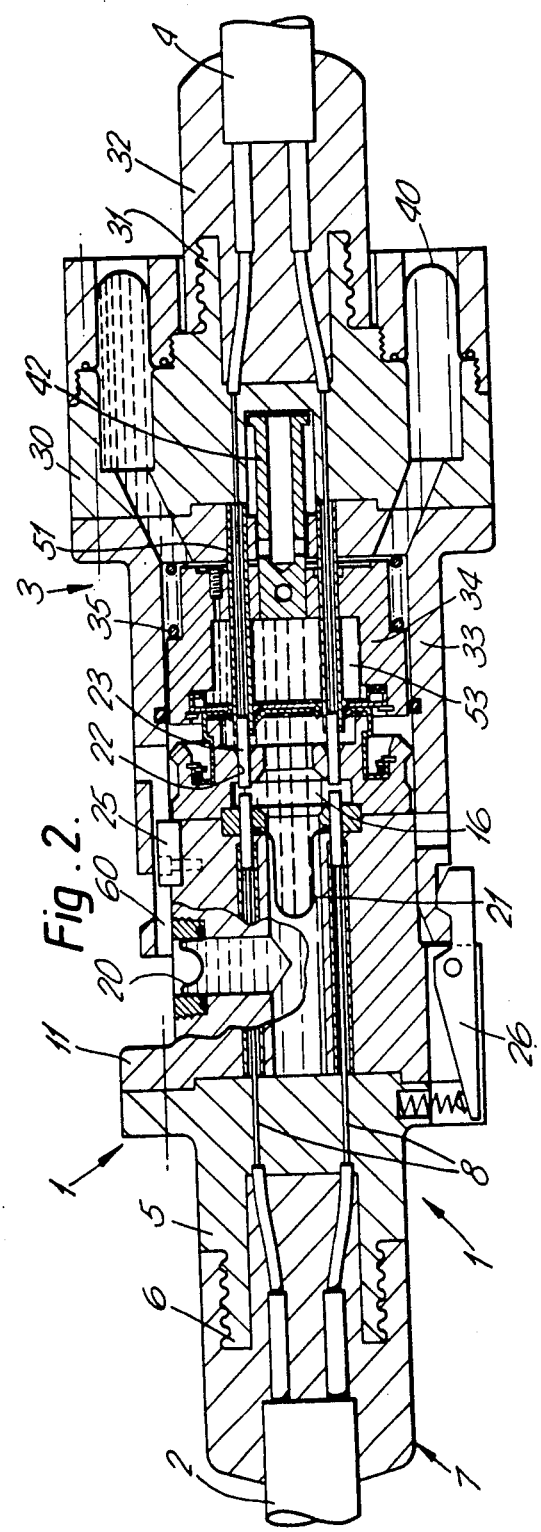
FIG. 2 shows the embodiment of FIG. 1 following interconnection of the two elements thereof.

Referring firstly to FIG. 1, the disconnected axial optical fibre connector shown therein comprises a first connector element 1 coupled to an optical fibre cable 2 and a second connector element 3 coupled to an optical fibre cable 4. The connector element 3 may be anchored underwater to an element, for example a valve, to be operated (not shown) or may be anchored underwater to a support with the cable 4 leading to a number of elements to be operated. Connector element 1 may be termed an input connection and connector element 3 may be termed an output connection. The connector of FIGS. 1 and 2 shows the connection of two optical fibres although it is not to be considered so limited. For example there may be six fibres equally spaced on a common pitch circle.

The connector element 1 comprises an overmoulding end body element 5 shaped at 6 to provide an anchor for an overmoulding 7. Optical fibres 8 of cable 2 extend through respective bores 9 therefor in the body element 5. A central body element 10 is bolted to the end body element 5 at flange 11 and includes a respective bore 12 for each optical fibre 8, the fibres being disposed in respective tubes 13 in the bores 12 and being terminated by respective expanded beam termination ferrules 14 which extend through an apertured plate collar 15 into a chamber 16 defined within a diaphragm end body element 17. The tubes 13 are crimped to the ferrules 14. The end body element 17 is bolted by bolts 18 to the central body element 10 with the collar 15 clamped therebetween. The central body element 10 includes a balancing chamber 19 filled with silicone oil which is closed to the exterior of the connector element by a first flexible diaphragm 20 and is closed to the chamber 16 within the diaphragm end body element 17 by a second flexible diaphragm 21. The edge of diaphragm 21 is clamped between collar 15 and central body element 10.

The end body element 17 includes a respective bore 22 aligned with each ferrule 14 for reception of ferrules 23 of the second connector element 3 as will be apparent from the following. The chamber 16 which is filled with a silicone oil is closed by a moulded diaphragm 24 secured to the end body element 17. The central body element is provided with a radial location key 25 and three spring locking clamps 26 equally spaced therearound. The diaphragm 24 is supported by an apertured plate 27, the apertures being aligned with bores 22 and ferrules 14, and the diaphragm 24 is provided with projecting pre-split ferrule entry hole portions 28.

For assembly of the connector element 1, the fibres 8 are inserted through the bores 9 in body element 5, termination ferrules 14 fitted to their ends, tubes 13 slid thereover and crimped to the ferrules 14 and the central body element 10 slid over the tubes 13 and secured to the body element 5. The overmoulding 7 is preferably formed after securing of element 10 to element 5. The diaphragm 21 is then fitted together with collar 15 and end body element 17. The plate 27 and diaphragm 24 are subsequently secured to end body element 17.

The second connector element 3 includes a body portion 30 shaped at 31 to provide an anchor for an overmoulding 32. Bolted to body portion 30 is a cylindrical guide 33 for a slidable head 34 which is spring loaded by spring 35 in the direction away from body portion 30. The spring chamber 36 is filled with silicone oil and is sealed at one end by a seal 37 with respect to which head 34 slides. The chamber 36 is connected to a volume displacement chamber 38 via bores 39. The chamber 38 is closed to the exterior of connector element 3 by means of a flexible rolling diaphragm 40 whose inner and outer edges are clamped between body portion 30 and a collar 41 screwed thereto. Projecting from slidable head 34 and secured thereto is a guide element 42 which is slidable in a guide bore 43 in body portion 30. By virtue of a flange 44 on the end of the guide element and a shoulder 45 of the cylindrical guide 33 the outermost end position of the slidable head, to which it is urged by spring 35, is defined. Bores 46 and 47 in the guide element ensure fluid communication between guide bore 43 and spring chamber 36.

The optical fibres 48 of cable 4 extend through respective bores 49 in the body portion 30, and into respective long flexible tubes 50 which extend through respective bores 51 in the end of guide 33 and respective bores 52 in the slidable head. The expanded beam termination ferrules 23 are disposed at the ends of optical fibres 48 and the tubes 50 are crimped to the ferrules 23. The ferrules 23 are located in the disconnected state of the connector elements within a chamber 53 defined within the slidable head 34 and filled with silicone oil. The chamber 53 is closed in the direction towards the exterior of the cylindrical guide 33 by a moulded diaphragm 54 secured to the slidable head. The diaphragm 54 is supported by an apertured plate 57, the apertures being aligned with the ferrules 23, and the diaphragm 54 is provided with recessed pre-split ferrule exit hole portion 58. The cylindrical guide 33 is apertured at 59 adjacent its end to permit the exit of water during connection of the connector elements 1 and 3. The guide 33 is also slotted at 60 to accept the radial location key 25. The overmoulding 32 is manufactured following fitting of the tubes and ferrules to the optical fibres similarly to overmoulding 7.

When the connector elements 1 and 3 are disconnected (as shown in FIG. 1) the ferrules at the ends of the optical fibres of both cables 2 and 4 are disposed within sealed chambers which are filled with a clean optically transparent medium, that is the silicone oil.

To connect the connector elements 1 and 3 they are first radially aligned to engage key 25 in the slot 60 of guide 33 and the first connector element 1 is inserted into the cylindrical guide 33 until the moulded diaphragms 24 and 54 are in contact when they together comprise a seal so that in effect the two sealed chambers 16 and 53 become one. Upon further movement of the first connector element into the guide 33 the slidable head 34 is displaced to the right against the force of the spring 35 and simultaneously the ferrules 23 penetrate the diaphragms 24 and 54 and are received in the bores 22. The locking clamps 26 are operated automatically as the connector elements 1 and 3 are brought together. Fluid displaced from the spring chamber is accommodated in the displacement chamber whose volume is automatically enlarged by movement of the rolling diaphragm 40. Displacement of fluid from the chamber 16 by entry of the ferrules thereinto is small but is compensated for by corresponding movement of diaphragms 21 and 20. Since the ferrules 23 do not pass through the diaphragms 24 and 54 until after the latter are in contact the lenses remain clean at all times. The combined action of the mobile fluids in the sealed chambers and the flexible diaphragms 20, 21 and 40 allows the connector to respond instantly to pressure changes. The result is that there is no force to push the fluid out of the sealed chambers or to push water into the chambers. Secondly it means that mating and demating are essentially independent of water depth. The flexibility of the tubes 50 is used to take up any tolerance misalignments between the ferrules 23 on their reamed guide bores 22 in the other chamber 16.

The life of the above described moulded diaphragm arrangement, that is the number of connections and disconnections which can be made before excessive water penetrates through the diaphragms, is somewhat restricted due to the tendency of some of the diaphragm materials employed to tear or be permanently deformed and to the fact that the diaphragms are opened by the ferrules directly.

In the alternative approach proposed in FIGS. 3 to 6 the diaphragms are opened whilst the connector elements are together but before the ferrules are allowed to penetrate them. In order to achieve this there is a separate diaphragm provided for each ferrule as will be apparent from the following.

Figure 3:
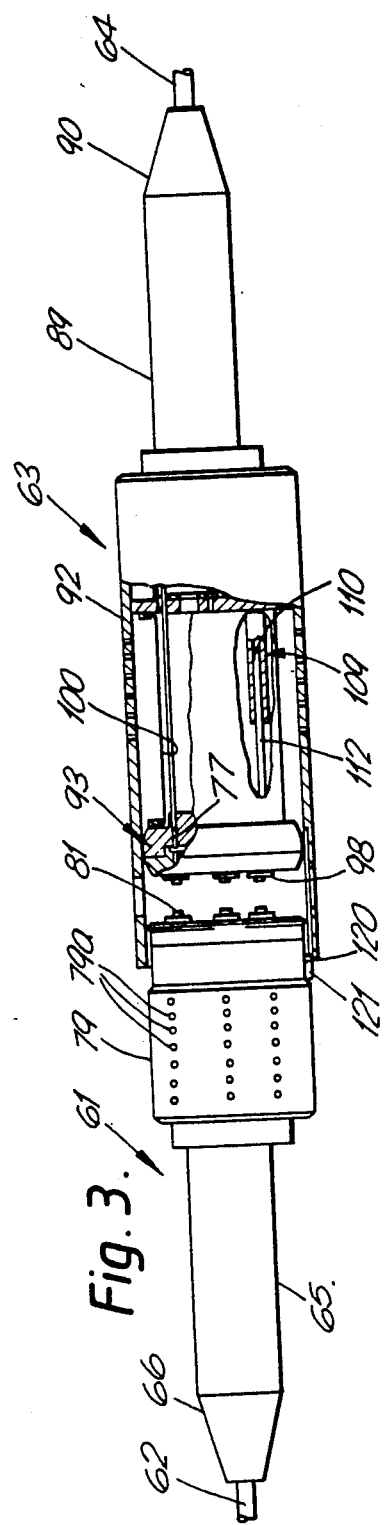
FIG. 3 shows, partially in cross-section, a second embodiment of optical fibre connector prior to interconnection of the two connector elements thereof.
Figure 4:
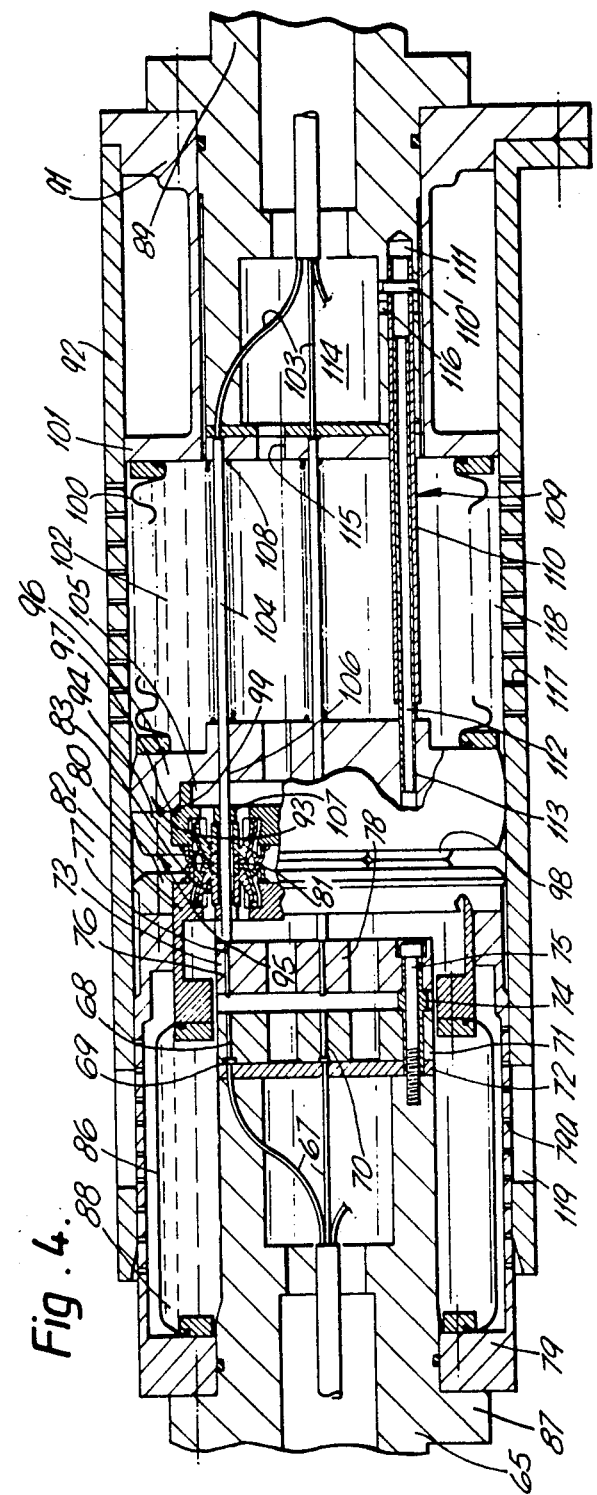
FIG. 4 shows, in cross-section, the embodiment of FIG. 3 following interconnection of the two elements thereof.

The connector of FIGS. 3 and 4 comprises a first connector element 61 coupled to an optical fibre cable 62 and a second connector element 63 coupled to an optical fibre cable 64. The connector element 63 may be anchored underwater to an element to be operated or may be anchored underwater to a support with the cable 64 leading to a number of elements to be operated. The connector illustrated is for the connection of six optical fibres which are arranged as five fibres equispaced on a circle about a sixth central fibre.

The first connector element 61 comprises a body member 65 into which extends the cable 62, the latter being sealed to the body member 65 via an overmoulding 66. The optical fibres 67 of cable 62 are provided with expanded beam termination ferrules 68 having flanges 69 and are located in respective bores 70 of a first apertured plate member 71 and held there by virtue of the flanges 69 being trapped between a plate 72 and plate member 71. The plate 72 and the first plate member 71 are secured to the body member 65 together with a second apertured plate member 73, a spacer element 74 ensuring a spacing therebetween, by bolts such as 75. The second plate member 73 has bores 76, for ferrules 77 of the second connector element, in alignment with bores 70 in the first plate member 71 together with fluid displacement bores 78. Preferably the bores 70 and 76 are formed in a common reaming process in order to achieve maximum alignment thereof.

Surrounding the right hand end of body member 65 is a sleeve member 79, having apertures 79a in its wall, to the righthand end of which member 79 is secured a clamping plate 80 from which the respective diaphragms 81 protrude in the closed state (see FIG. 5). The moulded diaphragms 81 have an annular edge which is clamped between the clamping plate 80 and a retaining member 82 for the respective three segment collets 83. The opposite ends of a tubular diaphragm 86 are secured to the retaining member 82 and the left hand end of the sleeve member 79 which is secured to a flange 87 of the body member 65. The chamber 88 defined within the tubular diaphragm 86, and the various bores of the members within sleeve member 79, is filled with silicone oil.

The second connector element 63 includes a body member 89, similar to body member 65, into which extends the cable 64, the latter being sealed to the body member 89 via an overmoulding 90. Bolted to the body member 89 is further body member 91 to which is bolted a cylindrical guide 91 for a slidable head or floating connector housing 93 which comprises a clamping plate 94 secured by screws at 95 to a plate member 96 and a plate member 97. The annular rim of diaphragms such as 98 is clamped between clamping plate 94 and plate member 97 which is secured in position by being clamped between clamping plate 94 and plate member 96. A ring seal 99 ensures sealing. A tubular diaphragm 100 is secured between plate member 96 and an end wall portion 101 of further body member 91 defining a pressure/volume compensation chamber 102.

The connector illustrated in FIGS. 3 and 4 is designed for connecting six fibres, five diaphragms 98 being equispaced on a common pitch circle about the sixth central diaphragm. The optical fibres 103 of cable 64 extend through long flexible tubes 104, which are secured at one end to the end wall 101, to the expanded beam termination ferrules 77 which are secured to the other end of the long flexible tubes 104. In the disconnected state the ferrules 77 extend into a chamber 105 defined between plate members 96 and 97, the tubes 104 being slidable through bores 106 in plate member 96, which bores are aligned with bores 107 in plate member 97. Plate member 97 is equivalent to retaining member 82. The bores 106 and 107 are preferably formed in a common reaming operation to ensure alignment. The diaphragms 98 have collets as those of diaphragms 81 which will be described in greater detail hereinafter with respect to FIGS. 5 and 6. Each tube 104 extends through a respective compression spring 108, the opposite ends of which abut the plate member 96 and the end wall portion 101 of the further body member 91. In order to facilitate the guiding of the slidable head 93, five guide tube assemblies 109, only one of which is shown in the drawings, are provided. The guide tube assemblies 109 include tubular members 110 which are secured in bores 111 of the further body member 91 by pins 110$^1$ and tubular members 112 which are at one end secured in bores 113 of the slidable head 93 and whose other ends are slidable in the tubular members 110. A chamber 114 in further body member 91 communicates with chamber 102 via a bore 115 in end wall portion 101 and with chamber 105 via a bore 116, body member 91 and tubular member 110 and the interiors of tubular members 110 and 112. The chambers 102, 105 and 114 are filled with silicone oil. The body member 92 is provided with apertures 117 through which the chamber 118 external to the tubular diaphragm is in communication with the environment exterior to the connector element, apertures 119 via which sea water, for example, can be expelled from between the connector elements during the act of connection, and a slot 120 for a connector orientation key 121 disposed on the connector element 61.

Referring now to FIGS. 5 and 6 the structure and operation of diaphragms 81 or 98 which are of identical design, will be described, the reference numerals employed relate to diaphragms 81. The moulded diaphragm 81 has a beaded annular edge 122 which is clamped between clamping plate 80 and retaining plate 82 and is otherwise substantially part-conical in shape with retaining lips 123 and 124 at opposite ends as indicated. Disposed within the moulded diaphragm 81 is the three segment (longitudinally) metallic collet 83 which segments are in contact with one another in the closed position shown in FIG. 5. Disposed at the diaphragm lip 124 end of the collet 83 is a three segment (longitudinally) moulded plastics insert 125. The collet 83 includes an aperture 126 with a tapered surface 127 and a cylindrical surface 128 and the retaining member 82 includes a cylindrical projection 129 engaged in the aperture 126. The various cavities within the diaphragm, collet and retaining member are filled with silicone oil. In the closed position the moulded diaphragm causes the various elements to be in the positions shown.

To open the diaphragm aperture for passage therethrough of a ferrule 77 (not shown in FIGS. 5 and 6) when the connector elements 61 and 63 are brought together the diaphragms 81 and 98 first come into sealing contact and upon further relative movement of elements 61 and 63 towards one another the diaphragms 81 and 98 are pushed further into their respective retaining plates. As can be appreciated from FIGS. 5 and 6, when this happens the engagement of the cylindrical projection 129 with the tapered surfaces 127 of the collet segments causes the latter to be separated from another. The movement apart being limited by the subsequent engagement of the cylindrical projection with the cylindrical surface 128 of the collet segments. Apertures such as 130 in both diaphragms are thus opened before the ferrules 77 pass therethrough. The plastics inserts, for example of urethane, serve to give the required sealing when the connector elements are disconnected. The cylindrical projection 129 also ensures that the collet segments sit squarely on it so that the ferrule can pass through aperture 130 unimpeded.

To connect the connector elements 61 and 63 together they are first radially aligned to engage key 121 in slot 120 and the first connector element 61 is inserted into cylindrical guide 92 so that the diaphragms 81 and 98 engage and subsequently open the apertures 130 therein. Upon further insertion the slidable head 93 is displaced to the right (FIG. 4) against the force of the springs 108, whilst being guided by guide tube assemblies 109, and the ferrules 77 pass through the aligned apertures 130 and become disposed in the respective one of the bores 76 of the second apertured plate 73 so that they are aligned with ferrules 68. The force of the springs 108 and the length of tubular members 110 serve to limit the movement of the slidable head. Locking clamps (not shown) are then engaged to hold the connector elements together. During disconnection of the connector elements the ferrules 77 will be withdrawn back into chamber 105, and the collet segments will be brought back together (FIG. 5) before the diaphragms are separated. Silicone oil displaced during the connection process is accommodated by movement the tubular diaphragms 86 and 98, which also serve to compensate for subsea pressure variations. Since the ferrules 77 are always disposed in silicone oil the lenses remain clean at all times.

In both of the embodiments described above the lenses of the ferrules are protected from the external environment irrespective of whether the connector elements (halves) are mated or demated. The mounting of the ferrules at the end of long flexible tubes through which the optical fibres extend provides sufficient flexibility for accurate alignment of the two connector elements without requiring tight manufacturing tolerances. In the demated state the lenses in both halves of the connector are retracted into their own sealed chambers filled with a clean optically transparent medium (silicone oil). When the connector halves are mated the diaphragms on each half come into contact with one another. The optical ferrules in one chamber penetrate the two diaphragms and enter the other chamber, forming an optical coupling. The diaphragms are pre-formed in order to allow the penetration to occur.

Typically the silicone oil has a viscosity of 60,000–100,000 centistokes and at these viscosities it is an excellent water repellent and will not leak out of the optical chambers easily. The main bodies of the connector elements may be made from nickel aluminium bronze, which has good wear characteristics and resistance to underwater corrosion. The optical ferrules and tubes may be made from Monel 400 and the springs from Inconel, both of which materials are suitable for subsea use. The diaphragms may be made from fabric reinforced nitrile rubber.

We claim:

1. An optical fibre connector including two connector elements, wherein when the connector elements are disconnected optical fibre terminations to be optically coupled by the connector are disposed in respective chambers of the connector elements, which channels are sealed against external fluid pressure by respective diaphragm means, wherein when the two connector elements are connected the diaphragm means are in sealing contact with one another and the terminations of the connector element are disposed in the chamber of the other element having penetrated both diaphragm means, and wherein each of the optical fibre terminations of one connector element is secured to one end of a respective flexible tube through which the respective optical fibre extends, the other end of which tubes are secured to a housing member of the one connector element.

2. An optical fibre connector as claimed in claim 1, wherein a respective diaphragm of the diaphragm means is associated with each optical fibre termination.

3. An optical fibre connector as claimed in claim 2, wherein when the connector elements are being connected the diaphragms are brought into sealing contact and apertures for the passage therethrough of the terminations of the one connector element are opened before penetration by the terminations.

4. An optical fibre connector as claimed in claim 1, wherein each diaphragm means is common to all of the optical fibre terminations of the respective connector element and wherein when the connector elements are being connected the diaphragm means are brought into sealing contact and apertures therethrough are opened by the terminations of the one connector element.

5. An optical fibre connector as claimed in claim 1, wherein the one connector element includes a slidable head and a cylindrical guide therefor, the diaphragm means being secured to the slidable head and the chamber of the one connector element being disposed within the slidable head.

6. An optical fibre connector as claimed in claim 5 further including guide means for the slidable head including means fast with the slidable head and reciprocable with respect to a bore in a connector housing member.

7. An optical fibre connector as claimed in claim 5, wherein spring means are provided which act on the slidable head in the direction to cause the terminations of the one connector element to be disposed in their respective chamber upon disconnection of the connector elements and prior to breaking the sealing contact between the diaphragm means.

8. An optical fibre connector as claimed in claim 1 wherein the chambers are filled with a viscous, optically clear liquid and wherein the connector elements further include pressure/volume compensation chambers coupled to said connector element chambers.

9. An optical fibre connector as claimed in claim 1 wherein the other connector element includes an apertured plate, in apertures of which the terminations of the other connector element are disposed, and a member having bores in alignment with the apertures into which bores the terminations of the one connector element are introduced upon connection of the two elements.

10. An optical fibre connector as claimed in claim 1 and including means for ensuring correct relative orientation of the connector elements upon connection and means for maintaining the connector elements in the connected state when required.

11. An optical fibre connector as claimed in claim 3, wherein each diaphragm includes a premoulded diaphragm, a three segment longitudinally, with respect to the axis of movement of the termination therethrough, split collet disposed therein, and a three-segment longitudinally split insert disposed at one end of the collet, wherein the collet includes a tapered guide surface and a cylindrical guide surface, wherein the diaphragm is secured with respect to a retaining member of the respective connector element, which retaining member includes guide means co-operable with the collet guide surfaces whereby when the diaphragms contact upon connection of the connector elements each diaphragm is moved inwardly with respect to its retaining member and the co-operation of the tapered guide surface and the guide means causes the collet segments to be moved radially apart and to open an aperture therebetween for the passage of the termination.

12. An optical fibre connector including two connector elements, wherein when the connector elements are disconnected optical fibre terminations to be optically coupled by the connector are disposed in respective chambers of the connector elements, which chambers are sealed against external fluid pressure by respective diaphragm means, wherein when the two connector elements are connected the diaphragm means are in sealing contact with one another and the terminations of one connector element are disposed in the chamber of the other element having penetrated both diaphragm means, wherein a respective diaphragm of the diaphragm means is associated with each optical fibre termination, wherein when the connector elements are being connected the diaphragms are brought into sealing contact and apertures for the passage therethrough of the terminations of the one connector element are opened before penetration by the terminations, and wherein each diaphragm includes a premoulded diaphragm, a three segment longitudinally, with respect to the axis of movement of the termination therethrough, split collet disposed therein, and a three-segment longitudinally split insert disposed at one end of the collet, wherein the collet includes a tapered guide surface and a cylindrical guide surface, wherein the diaphragm is secured with respect to a retainining member of the respective connector element, which retaining member includes guide means co-operable with the collet guide surfaces whereby when the diaphragms contact upon connection of the connector elements each diaphragm is moved inwardly with respect to its retaining member and the co-operation of the tapered guide surface and the guide means causes the collet segments to be moved radially apart and to open an aperture there between for the passage of the termination.

13. An optical fibre connected as claimed in claim 12 wherein each of the optical fibre terminations of the one connector element is secured to one end of a respective flexible tube through which the respective optical fibre extends, the other ends of which tubes are secured to a housing member of the one connector element.

14. An optical fibre connector as claimed in claim 13, wherein the one connector element includes a slidable head and a cylindrical guide therefor, the diaphragm means being secured to a slidable head and the chamber of the one connector element being disposed within the slidable head.

15. An optical fibre connector as claimed in claim 14 further including guide means for the slidable head including means fast with the slidable head and reciprocable with respect to a bore in a connector housing member.

16. An optical fibre connector as claimed in claim 14, wherein spring means are provided which act on the slidable head in the direction to cause the terminations of the one connector element to be disposed in their respective chamber upon disconnection of the connector elements and prior to breaking the sealing contact between the diaphragm means.

17. An optical fibre connector as claimed in claim 12, wherein the chambers are filled with a viscous optically clear liquid and wherein the connector elements further include pressure/volume compensation chambers coupled to said connector element chambers.

18. An optical fibre connector as claimed in claim 12, wherein the other connector element includes an apertured plate, in apertures of which the terminations of the other connector element are disposed, and a member having bores in alignment with the apertures into which bores the terminations of the one connector element are introduced upon connection of the two elements.

19. An optical fibre connector as claimed in claim 12 and including means for ensuring correct relative orientation of the connector elements upon connection and means for maintaining the connector elements in the connected state when required.

* * * * *